Aug. 26, 1924.

OTTO V. BRONK 1,506,358

SENDING ARRANGEMENT FOR WIRELESS TELEGRAPHY

Filed Sept. 3, 1921

Inventor
OTTO von BRONK

By his Attorney

Patented Aug. 26, 1924.

1,506,358

UNITED STATES PATENT OFFICE.

OTTO v BRONK, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

SENDING ARRANGEMENT FOR WIRELESS TELEGRAPHY.

Application filed September 3, 1921. Serial No. 498,427.

(GRANTED UNDER THE PROVISIONS OF THE ACT OF MARCH 3, 1921, 41 STAT. L., 1313.)

*To all whom it may concern:*

Be it known that I, OTTO VON BRONK, citizen of the German Republic, residing at Berlin, Germany, have invented certain new and useful Improvements in Sending Arrangements for Wireless Telegraphy (for which I have filed an application in Germany, November 7, 1917, Patent No. 303,973), of which the following is a specification.

It is necessary, for instance in directional wireless telegraphy, to produce alternating currents in conductors distributed over a considerable space, which alternating currents have definite phase relations. With a given conductor arrangement and certain phase relations the direction of the radiation obtained can be determined. The connection required for the phase control of the alternating currents in the various conductors must, in the interest of economy be effected with a small consumption of energy.

Figure 1:
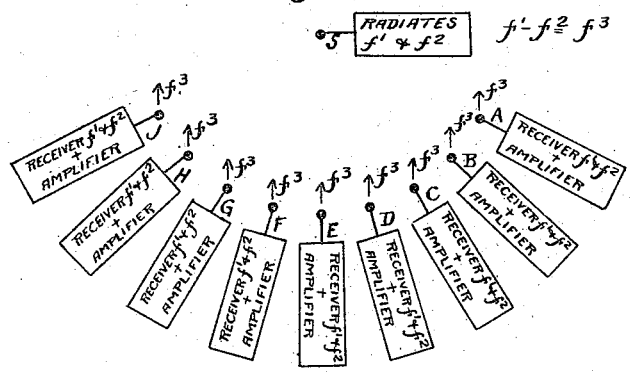
Figure 2:
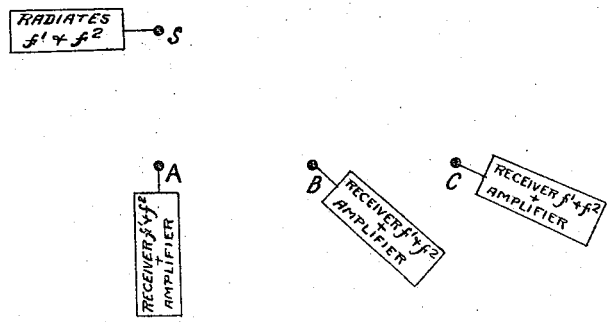

In accordance with the invention, the desired phase relations are obtained in an improved manner, illustrated by way of example in Figs. 1 and 2, which represent diagrammatically certain embodiments of the invention.

By way of illustration, it will be assumed that a wave length of 15 km., is to be radiated in a certain direction, this wave length corresponding to a frequency of 20,000. The conductors or antenna portions which are to radiate energy at this frequency, are distributed over a region whose length may, for example, extend over a distance of several wave lengths, which in Fig. 1 may be 60 km. An undamped transmitter is arranged at a point S which is approximately equally distant from all of the antenna portions A, B, C, D, E, F, G, H, I, and J, which are arranged in a segment of a circle and may consist of vertical antenna elements. The undamped sending station may be of very small power and sends out two wave lengths of a magnitude of about 200 meters. The two wave lengths are chosen so that the difference between the selected frequencies, $f^1$ and $f^2$, is equal to the frequency (20,000) to be sent out and which may be denoted by $f^3$. In the illustration selected, one wave may, therefore, be 200 meters (frequency $1.5 \times 10^6$) and the other 202.7 (frequency $1.48 \times 10^6$). If a shorter wave length is to be radiated from the antenna elements the difference between the frequencies of the two controlling waves radiated from the transmitter S must be greater.

The general relation is $$\lambda_\epsilon = \frac{\lambda_1 \lambda_2}{\lambda_1 - \lambda_2}$$

where $\lambda_\epsilon$ signifies the wave-length to be sent out by the antenna elements, and $\lambda_1$ and $\lambda_2$ the two control-wave-lengths.

In the vicinity of each of the separate antenna elements A, B, C, etc. which are to send out the 15 km. wave-length, there is located a small directional receiving arrangement, for example, a rectangular loop coupled to the antenna element for receiving the two waves of the transmitter S. The two waves act together upon a rectifying or detector circuit, in which, under the influence of the interference, or beat phenomenon, there occurs an alternating current of the frequency 20000. The grid electrodes of electron relays connected with the respective antenna elements are controlled by this alternating current and the relays, therefore, supply an amplified alternating current of the frequency of 20,000. The amplification is repeated until every antenna element has the necessary transmitting power. An alternating current of a frequency of 20,000 cycles and the same phase will then flow in each antenna element. In the last steps of the amplification, one or more arc-arrangements controlled by the electron relay current may be used.

If the controlling sender is not located at unequal distances from the various antenna elements A, B, C, etc. as shown in Fig. 2, exactly fixed phase differences will occur in the currents radiated from said elements. The current-amplitude in B with relation to the current amplitude in A has a time-difference of $\dfrac{SB - SA}{c}$ where $c$ is the speed of light.

The phase-angle becomes $$\frac{2\pi T_\epsilon C}{SB - SA}$$

where $T_\epsilon$ equals the duration of the oscillation.

It is therefore possible to adjust the phase differences of the separate antenna elements within wide limits by a suitable selection of the relative locations of the controlling transmitters and the elements A, B, C, etc.

Having described my invention what I claim is:

1. The method of controlling the radiation from a plurality of separated radiators which consists in radiating currents of low intensity having a frequency difference equal to the frequency to be transmitted, receiving said currents at each of the radiators, and utilizing the received currents to control the radiation from the radiators.

2. The method of controlling the radiation from a plurality of separated radiators which consists in radiating currents of low intensity, having a frequency difference equal to the frequency to be transmitted, receiving the currents at each of the radiators, producing beats between said currents, and utilizing the beat currents to control the radiators.

3. The method of controlling the radiation from a plurality of separated radiators which consists in radiating currents of low intensity, having a frequency difference equal to the frequency to be transmitted, receiving the currents at each of the radiators, producing beats between said currents, amplifying the beats and using the amplified currents to produce radiation from the radiators.

4. The method of controlling the radiation from a plurality of separated radiators which consists in radiating from a source of energy currents of low intensity having a difference in frequency equal to the frequency to be transmitted by the radiators, receiving said currents at each of the radiators, producing beats between the currents, utilizing the beat currents to control the radiators and adjusting the phase-differences of the currents radiated from the different radiators by locating the source of energy at different distances therefrom.

In testimony whereof I affix my signature.

OTTO v BRONK.